(12) United States Patent
Huddar et al.

(10) Patent No.: US 11,212,220 B2
(45) Date of Patent: Dec. 28, 2021

(54) OPTIMIZED RECONCILIATION IN A CONTROLLER-SWITCH NETWORK

(71) Applicant: Telefonaktiebolaget LM Ericsson (publ), Stockholm (SE)

(72) Inventors: Prasanna Huddar, Bangalore (IN); Sumanth Mysore Srinivasamurthy, Bangalore (IN); Chakri Padala, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/764,341

(22) PCT Filed: Nov. 17, 2017

(86) PCT No.: PCT/IN2017/050536
§ 371 (c)(1),
(2) Date: May 14, 2020

(87) PCT Pub. No.: WO2019/097530
PCT Pub. Date: May 23, 2019

(65) Prior Publication Data
US 2020/0280512 A1    Sep. 3, 2020

(51) Int. Cl.
*H04L 12/721* (2013.01)
*H04L 12/715* (2013.01)
(Continued)

(52) U.S. Cl.
CPC .............. *H04L 45/38* (2013.01); *H04L 45/64* (2013.01); *H04L 47/2441* (2013.01); *H04L 47/6275* (2013.01)

(58) Field of Classification Search
None
See application file for complete search history.

(56) References Cited

U.S. PATENT DOCUMENTS

| 2015/0326425 A1 | 11/2015 | Natarajan et al. |
| 2016/0352613 A1 | 12/2016 | Narayanan et al. |

(Continued)

FOREIGN PATENT DOCUMENTS

| EP | 2806603 A1 | 11/2014 |

OTHER PUBLICATIONS

International Search Report and the Written Opinion of the International Searching Authority, issued in corresponding International Application No. PCT/IN2017/050536, dated Feb. 15, 2018, 7 pages.

*Primary Examiner* — Anh Ngoc M Nguyen
(74) *Attorney, Agent, or Firm* — Rothwell, Figg, Ernst & Manbeck, P.C.

(57) ABSTRACT

A method performed by a switch in a software-defined network (SDN), the switch being communicatively coupled to a controller, is provided. The method includes performing a first flow action with respect to a first flow (e.g., deleting the first flow). The method further includes storing a first flow event data object, the first flow event data object indicating the first flow and the first flow action. The method further includes storing a first tag in association with the flow event data object. The method further includes generating a flow event message comprising the first flow event data object and the first tag. The method further includes sending the flow event message to the controller.

20 Claims, 8 Drawing Sheets

(51) Int. Cl.
*H04L 12/851* (2013.01)
*H04L 12/865* (2013.01)

(56) References Cited

U.S. PATENT DOCUMENTS

| | | | |
|---|---|---|---|
| 2017/0048197 A1* | 2/2017 | Zuk | H04L 67/327 |
| 2017/0317887 A1 | 11/2017 | Dwaraki et al. | |
| 2018/0131602 A1* | 5/2018 | Civanlar | H04L 49/3009 |
| 2019/0297007 A1* | 9/2019 | Lessmann | H04L 45/38 |

* cited by examiner

OPTIMIZED RECONCILIATION IN A CONTROLLER-SWITCH NETWORK

CROSS REFERENCE TO RELATED APPLICATION(S)

This application is a 35 U.S.C. § 371 National Phase Entry Application from PCT/IN2017/050536, filed Nov. 17, 2017, designating the United States, the disclosure of which is incorporated herein by reference in its entirety.

TECHNICAL FIELD

Disclosed are embodiments related to reconciliation of flow events in a software-defined network (SDN).

BACKGROUND

In a SDN, including one or more controllers each coupled to one or more switches, each switch may include a database (DB) of flows that are configured by the corresponding controller. A flow is a rule for processing data traffic (e.g., a sequence of packets) through the SDN (e.g., a rule for a particular IP flow). For example, a flow may direct that packets matching a certain condition should be forwarded to a specified port. Another rule may instruct that packets matching another certain condition should be dropped. The controller also knows what flows exist on each switch. Any change of the flow state in an SDN switch is informed to the corresponding SDN controller by flow events generated from the SDN switch. An SDN controller sends flow configurations (a.k.a. "flows") to an SDN switch; an SDN switch sends flow related notifications (e.g., flow events) to the SDN controller.

When a connection between a controller and a switch is lost (i.e., the controller and switch become disconnected), and then reestablished; following reestablishment, the controller does not know the existing flow state on the switch, because it is possible that some flows could have been added, deleted, or modified while the controller was disconnected from the switch. Accordingly, the controller must start a reconciliation of flow state, for example by the controller re-sending (a.k.a. re-playing) the flow actions (e.g., delete flow, insert flow, modify flow) back to the switch upon re-connection with the controller. Reconciliation helps to bring the switch back to a state where forwarding of data packets can happen correctly.

SUMMARY

Controllers in a SDN can manage large numbers of switches. Disconnection and re-connection of controller and switch can occur due to, e.g., network conditions, controller upgrades, cluster issues, switch upgrades, and so forth. Every time a switch re-connects to a controller, the controller must re-play all the flow actions to the reconnected switch to reconcile flow state. The time it takes to reconcile depends on the number of flow actions that needs to be re-played. This can lead to large delays and increase latency.

Currently, to reconcile flow state between a controller and a switch, steps similar to the steps mentioned below are required. All the flow actions corresponding to the flows from the controller to the reconnecting switch (or switches) must be performed by the switch. For each such reconnecting switch connecting to the controller, the controller correlates the switch flows with a flow database in the controller; the controller then re-plays the delta changes on the switch (e.g., any pending flows (and the corresponding flow actions) configured by the controller for the particular switch, which were not sent to the switch because of a disconnection). Alternatively, the controller can push the flows onto the switch, thereby requiring the switch to perform the correlation of flows. All flow events are treated with equal priority with respect to pushing notifications of the flows from the switch to the controller.

Optimizing the above-described reconciliation (e.g., flow re-play) can free up controller and/or switch resources, allowing the controller and/or switch to work on other network conditions, enabling controller applications to start using the switch more quickly, and also causing the switch to more quickly regain the correct forwarding state.

The problems described above (e.g., delays caused by reconciliation) are further exacerbated in a cloud deployment where multiple controllers can be deployed to provide load balancing and to increase availability. In a cloud environment, new services get deployed and re-configured quickly, thereby causing rapid changes to the flow databases. Controllers are also deployed with scale-out and scale-in features, which necessitates disconnecting a switch from one controller and re-connecting the switch to a different controller, which further exacerbates the problem. In a multi-controller scenario, reconciliation also forces databases of controller instances to be synchronized much more, thereby causing caching churn (e.g., when items in a cache are purged from the cache frequently, limiting the effectiveness of the cache and increasing input/output operations, such as may be caused by frequent updating or synchronizing).

The problems with current approaches to reconciliation, in addition what is described above, can also include the following. Under the current approach to reconciliation, when one or more switches reconnects with a controller, the controller pushes all the corresponding flows onto each switch to get the flows aligned across the switches and the controller. On a controller restart, all the switches need to be synchronized similarly. Computing deltas (i.e., performing correlation) for large number of flows adds a large overhead. This computation can take place in the switch or the controller. If the switch calculates the delta, then the resources required will include an existing packet processing resource thereby limiting usage of that resource for other tasks such as processing packets. If the controller calculates the delta, with processing being centralized across many switches, time required will increase as the number of switches and flows increase (e.g., time may be proportional to number of switches and flows). Programming the millions of flows back onto the switch further adds overhead to the switch and also increases latency, thereby increasing the time for the switch to be ready to process packets correctly.

Additionally, with current methods, a controller's resource demands increase as the number of managed switches increases. Current methods are time and resource consuming. Differentiating between offline flows (flows added when the switch is not connected to the controller) and existing flows is also an issue in existing solutions. Current approach makes cloud deployment supporting controller scale-in and scale-out and dynamic load balancing of switches across controllers very expensive, as each switch moving from one controller to another controller requires a complete resynchronization. Controller restarts are very expensive. Further, reconciliation cannot be prioritized based on subscriber or application priority.

To address these and other problems, various solutions are proposed herein.

Embodiments utilize flow event data objects (a.k.a., "events" for short), such as, for example, a "flow removed event data object," which correspond to flow database changes sent from the switch to the controller, and add a unique tag to the flow event data object (e.g., associate the flow event data object with a unique tag) (and optionally including the switch's Data Packet Network (DPN) identifier (ID)). The tag may then be used to track the deltas of the flows as seen by the controller. A tag-event (TE) database may be kept on the switch, the TE database storing the reported flow event data object along with the tag associated with the flow event data object. In embodiments, the tag may be unique to the switch, or may be unique to each of the switches managed by the controller, or may be unique to each of the controllers in a multi-controller cluster. In one example, the tags are implemented using timestamps. In embodiments, these tags may be used by the switch and the controller to co-ordinate flows. After a reconnection, the controller and the switch may become reconciled by pulling and receiving just the flow event data objects associated with the missing tags (as opposed to all flow event data objects).

In embodiments, the controller maintains a TE database (a.k.a. DPN-TAG database), which may be indexed with the DPN-ID of the switch corresponding to the one or more tags stored in the database. The database may also be indexed by the last-processed tag; that is, the last tag received from a switch that the controller has processed. In embodiments, the database may be synchronized across controllers (e.g., in a multi-controller cluster). The database may help in multi-controller and scale-out and scale-in scenarios, with respect to synchronizing the controller's view of the switches across multiple controllers. In embodiments, the database may be updated in bulk or periodically to avoid continuous resynchronization of controllers.

In embodiments, an optional acknowledgment (ACK) message with a tag may be sent from the controller to the switch to indicate the most recent flow event data object that has been received and processed by the controller (e.g., an ACK with a tag value of "tag–100" indicates that the controller has received and processed the flow event data object associated with that tag value). This may help in reducing controller DPN-TAG database synchronization between controllers when there is a burst of messages and may also help in detecting when there is an overflow of the TE database. It may also help maintaining an optimized TE DB in both the switch and the controller. This ACK message may be sent as a separate message by itself, or can be piggy-backed with other messages (e.g., sent in the same data transmission as used for other scheduled messages) from the controller to the switch.

Embodiments allow a prioritized reporting of events from the switch to the controller (after a reconnect). Conventionally, the switch reports events in the order that they are generated. Enabling prioritized reporting allows for faster recovery of more important customers, connections, virtual machines (VMs), and so forth. The controller may push a priority indication (e.g., priority number) as an additional metadata with a flow add or flow update message (e.g., here metadata with a flow add or flow update message would include data describing the flow); and the switch may use this priority indication to encode the priority into the tag or as a separate metadata while processing and pushing the flow events to the controller. For example, the controller could add a priority indication of 9 for all base connectivity events, followed by 8 for important VPN user 8, and the default being a priority 0. In this example, when the controller connects to switch after restart, all 9 events in the database may sent first, followed by all 8 events, and so forth.

According to a first aspect, a method performed by a switch in a software-defined network, SDN, the switch being communicatively coupled to a controller, is provided. The method includes performing a first flow action with respect to a first flow (e.g., deleting the first flow). The method further includes storing a first flow event data object, the first flow event data object indicating the first flow and the first flow action. The method further includes storing a first tag in association with the flow event data object. The method further includes generating a flow event message comprising the first flow event data object and the first tag. The method further includes sending the flow event message to the controller.

In some embodiments, the method further includes receiving a first acknowledgment from the controller indicating that the controller has processed the flow event message associated with the first tag. In embodiments, the method further includes, receiving, from the controller, and before storing the first tag in association with the flow event data object, a message comprising a flow identifier identifying the first flow and a priority indicator indicating the priority of the first flow. In embodiments, the first tag comprises information that indicates the priority of the first flow. In embodiments, the flow event message comprises a Data Packet Network (DPN) identifier (ID) identifying the switch.

In some embodiments, the method further includes receiving from the controller a message comprising a tag; and in response to the message, retrieving, based on the tag included in the message, a set of one or more flow event data objects and sending, to the controller, the retrieved set of flow event data objects. In embodiments, retrieving the set of flow event data objects based on the tag included in the message includes identifying from a plurality of stored flow event data objects each flow event data object included in the plurality being logically after the tag included in the message and retrieving the identified flow event data objects. In embodiments, the method further includes receiving a second acknowledgment from the controller indicating the receipt of the set of flow event data objects and a last-acknowledged tag; and receiving a delta flow event message from the controller comprising flow events stored by the controller. In embodiments, the set of flow event data objects is ordered based on priority indications of the flow event data objects, and sending, to the controller (102), the retrieved set of flow event data objects includes sending the retrieved set of flow event data objects in the order based on the priority indications.

In some embodiments, the method further includes setting an error flag (e.g., TAG_MEMORY_OVERFLOW) indicating that an event could not be stored on the switch; and sending a message to the controller indicating that the error flag is set. In embodiments, the method further includes receiving a request from the controller to use a priority mode.

Embodiments provide various advantages. For example, embodiments of the first aspect avoid un-necessary replay (or reconciliation) of all the flows on the switches, when switches reconnect. Instead, in such embodiments, only the delta flows need to be replayed by the controller to the switch, on reconnect. This may help the controller to move the connected switches to a known state more quickly. Switches and controllers may also save on resources (e.g., compute resources, network resources, database resources)

for processing potentially millions of flows as part of reconciliation. The DPN-TAG database may help controllers scale-in, scale-out, and/or perform load rebalancing of controllers in case of uneven performance. Prioritized tagging may allow for faster recovery of high priority subscribers and/or applications.

Embodiments avoid having to replay all the flow event when switches re-connect to an SDN controller. In embodiments, a DPN-TAG database may be resynchronized across one or more controllers, belonging to one or more clusters, to enable efficient failover and/or load-balancing of switches between different controllers in a multi-controller environment. The DPN-TAG database may further allow scale-out and scale-in of one or more controllers.

In embodiments that provide for an acknowledgment (a.k.a. ACK) message, this has an advantage in that it may reduce the intra-controller messaging. An acknowledgment bit, for example, may be stored at the switch, which may result in a reduction to the number of tag exchange between nodes in a cluster. Further, the amount of event data and tags that need to be stored in a cluster-wide data store may also be reduced.

In embodiments, event data that needs to be persisted can be batched and then written to the data store instead of a write for every event. Embodiments also enable dynamic load balancing of switches across the cluster with minimal overhead. Embodiments may be extended to any SDN protocol, where a centralized control plane is managing multiple data planes. Embodiments may allow tracking and programming of offline flows by a controller. Embodiments may allow using tags with priority information, so that a switch can prioritize the notifications sent towards a controller.

According to a second aspect, a method performed by a controller in a software-defined network, SDN, the controller being communicatively coupled to a switch, is provided. The method includes receiving a first connection message from the switch. The method further includes, after receiving the first connection message, receiving a flow event message from the switch. The flow event message includes a first tag and a first flow event data object associated with the first tag, the first flow event data object comprising a flow identifier identifying a first flow. The method further includes storing the first tag in a database. The method further includes receiving a second connection message from the switch following a disconnection between the switch and the controller; and transmitting to the switch a message comprising the first tag.

In some embodiments, the method further includes sending a first acknowledgment to the switch indicating that the controller has processed the first tag. In embodiments, the method further includes, prior to receiving the flow event message, sending to the switch a priority indicator indicating a priority of the first flow. In embodiments, the flow event message indicates the priority of the first flow. In embodiments, the controller extracts from the flow event message a Data Packet Network (DPN) identifier (ID) identifying the switch. In embodiments, the method further includes, after sending to the switch the message comprising the first tag, receiving, from the switch, a set of one or more flow event data objects. In embodiments, the method further includes sending a second acknowledgment to the switch indicating the receipt of the set of flow event data objects and a last-acknowledged tag (e.g., associated with the receipt of the set of flow event data objects); and sending a delta flow messages to the switch comprising flows stored by the controller.

In some embodiments, storing the first tag in the database includes waiting for additional flow event messages from the switch, wherein the additional flow event messages includes additional tags; and storing, in a batch mode, the first tag and the additional tags in the database. In embodiments, the controller sends a request to the switch to use a priority mode. In embodiments, the first acknowledgment is contained within another message from the controller to the switch, such that the first acknowledgment is "piggybacked" on the another message. In embodiments, the method further includes receiving additional flow event messages from the switch, wherein the additional flow event messages include additional tags and additional flow event data objects associated with the additional tags, the additional flow event data objects comprising additional flow identifiers identifying additional flows; and after receiving additional flow event messages from the switch, sending a single acknowledgment message to the switch indicating that the controller has processed the first tag and the additional tags.

In some embodiments, the step of transmitting to the switch a message comprising the first tag is performed in response to receiving the second connection message from the switch. In embodiments, the first tag comprised in the message represents a last-processed tag. In embodiments, the method further includes synchronizing the database with additional databases corresponding to additional controllers in a cluster. In embodiments, the message comprising the first tag comprises a handshake message, and in embodiment the message comprising the first tag comprises an acknowledgment message. In embodiments, the method further includes sending a first connection message to the controller and sending a second connection message to the controller following a disconnection between the switch and the controller.

Advantages of the first aspect also apply to the second aspect, and to other aspects described herein.

According to a third aspect, a device for a software-defined network, SDN, including a controller, is provided. The device is adapted to: perform a first flow action with respect to a first flow (e.g., deleting the first flow); store a first flow event data object, the first flow event data object indicating the first flow and the first flow action; store a first tag in association with the flow event data object; generate a flow event message comprising the first flow event data object and the first tag; and send the flow event message to the controller.

According to a fourth aspect, a device for a software-defined network, SDN, including a switch, is provided. The device is adapted to: receive a first connection message from the switch; after receiving the first connection message, receive a flow event message from the switch, wherein the flow event message includes a first tag and a first flow event data object associated with the first tag, the first flow event data object comprising a flow identifier identifying a first flow; store the first tag in a database; receive a second connection message from the switch following a disconnection between the switch and the controller; and transmit to the switch a message comprising the first tag. In embodiments, the device is further adapted to synchronize the database with additional databases corresponding to additional controllers in a cluster.

According to a fifth aspect, a device for a software-defined network, SDN, including a controller, is provided. The device includes a performing module configured to perform a first flow action with respect to a first flow (e.g., deleting the first flow). The device further includes a storing module configured to store a first flow event data object, the first flow event data object indicating the first flow and the first flow action. The storing module is further configured to store a first tag in association with the flow event data object. The device further includes a generating module configured to generate a flow event message comprising the first flow event data object and the first tag. The device further includes a sending module configured to send the flow event message to the controller.

According to a sixth aspect, a device for a software-defined network, SDN, including a switch, is provided. The device includes a receiving module configured to receive a first connection message from the switch. The receiving module is further configured to, after receiving the first connection message, receive a flow event message from the switch. The flow event message includes a first tag and a first flow event data object associated with the first tag, the first flow event data object including a flow identifier identifying a first flow. The device further includes a storing module configured to store the first tag in a database. The receiving module is further configured to receive a second connection message from the switch following a disconnection between the switch and the controller. The device further includes a transmitting module configured to transmit to the switch a message comprising the first tag.

According to a seventh aspect, a computer program, comprising instructions which, when executed on at least one processor, causes the at least one processor to carry out the method according to any one of first and second aspects, is provided.

According to an eighth aspect, a carrier comprising the computer program of the seventh aspect, wherein the carrier is one of an electronic signal, optical signal, radio signal or computer readable storage medium, is provided.

BRIEF DESCRIPTION OF THE DRAWINGS

The accompanying drawings, which are incorporated herein and form part of the specification, illustrate various embodiments.

DETAILED DESCRIPTION

Figure 1:
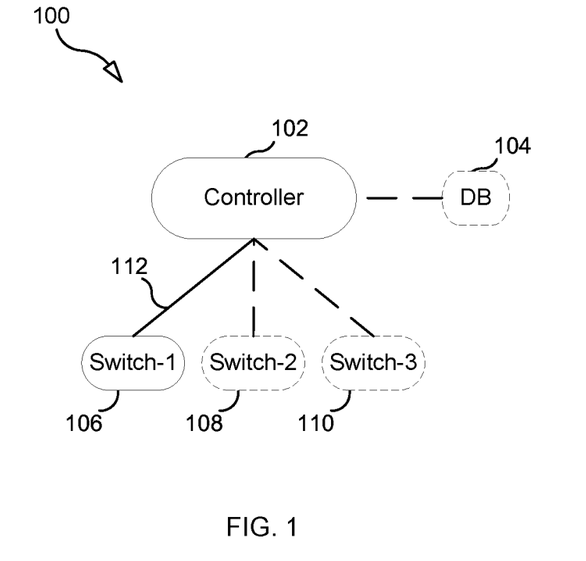
FIG. 1 illustrates a system according to some embodiments.

FIG. 1 illustrates a SDN network according to some embodiments. As shown in FIG. 1, an SDN network 100 may include a controller 102 communicatively coupled to one or more switches 106, 108, 110. Controller 102 may be communicatively coupled to switch 106, for example, by a connection 112. Controller 102 may include a database 104. Database 104 may be part of, or housed within, controller 102, or may be separate from controller 102 and connected thereto by a connection (e.g., a network connection).

Switches 106, 108, 110 may be extended to put "tags" on all flow state change events on the switch (such as a flow removed event). In embodiments, such flow state change events may come from sources other than controller 102. Controller 102 (and/or database 104) may receive these "tags" from switches 106, 108, 110, and may process and/or store these tags. For example, controller 102 (and/or database 104) may store the last such tag that controller 102 has processed as a last-processed tag, and this last-processed tag may include the DPN-ID corresponding to the switch 106, 108, 110 reporting the event. Tags stored by controller 102 (and/or database 104), including the last-processed tag, may be indexed by the DPN-ID, meaning that they may be retrieved based on a given DPN-ID (e.g., controller 102 may keep separate lists of processed tags for each switch under its control). Switch 106, 108, 110 may also save the flow state change events and the associated tags in the switch (e.g., locally, or in a database associated with the switch).

When a (re)synchronization is required (e.g., when connection 112 is lost and then re-established), controller 102 and switch 106, 108, 110 may use the last-processed tag associated with the switch's DPN-ID to coordinate and (re)synchronize the flows.

Figure 2:
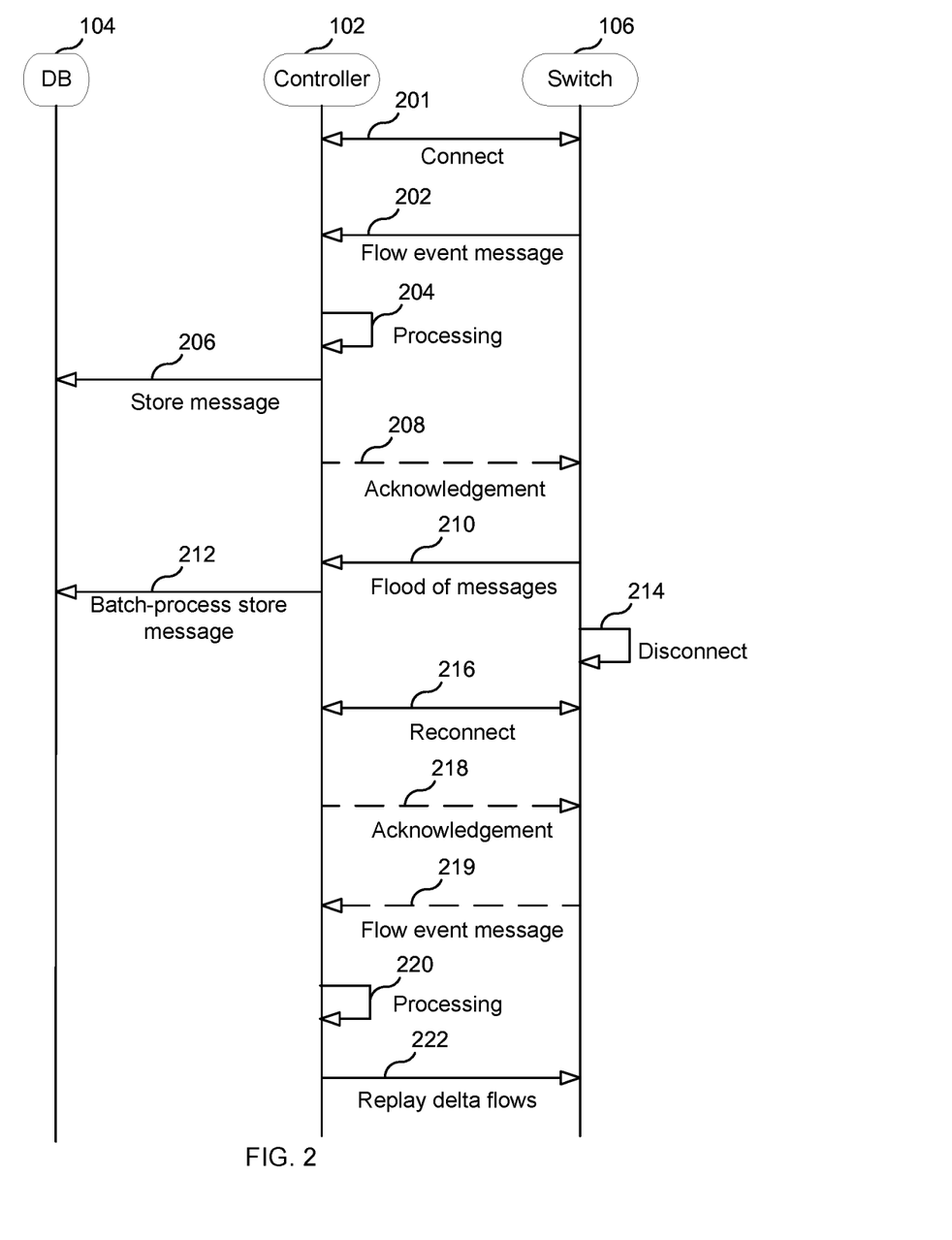
FIG. 2 illustrates a message diagram according to some embodiments.

FIG. 2 illustrates a message diagram according to exemplary embodiments. The algorithm embodied in FIG. 2 and described below supports multiple switches 106, 108, 110. For ease of depiction and explanation, only switch 106 is illustrated in FIG. 2 and described below. The message diagram shows reconciliation between controller 102 and switch 106. In this embodiment, controller 102 communicates with database 104. The message diagram "begins" after connection 112 has been (re)established.

At 201, switch 106 connects to controller 102. For example, switch 106 may send a first connection message to controller 102 requesting a connection. Controller 102 may also send messages (e.g., a handshake message) to switch 106 as part of the connection.

At 202, switch 106 sends a flow event message to controller 102. The flow event message may be generated whenever a flow changes state on the switch 106 (e.g., a flow-removed event, a flow modify event, etc.). The flow event message includes a flow event data object (a.k.a., "event" for short) and a tag associated with the event. In embodiments, switch 106 may further include a DPN-ID in the flow event message. Controller 102 may be able to extract a DPN-ID for switch 106 based on the flow event message, or from database 104 (e.g., from associated connection information, such as information from a TCP connection). The tag included with the flow event message may be unique (e.g., unique to the switch 106). For example, uniqueness can be maintained by a sequentially increasing number that the switch associates with the tag, and/or by associating the given switch's DPN-ID with the tag. As an example, the tag may be a timestamp.

For all flow event data objects that switch 106 reports to controller 102, switch 106 may store the flow event data object along with the tag associated with the flow event data object. In some embodiments, the flow event data object may be stored in the same "on-wire" format (e.g., in a format corresponding to how the object is transmitted), or the flow event data object may be stored in a different format (e.g., in a format more optimized for storage on the switch). Switch 106 may also store a timestamp in cases where the tag does not already contain a timestamp. In some embodiments, switch 106 may have limited resources (e.g., storage capacity), and may be limited to storing the most recent "n" events with associated tags, where "n" may be based on the resource availability in the switch. If controller 102 requests the replay of events from a tag which is not currently available in the switch (e.g., not within the most recent "n" events), switch 106 may send to the controller 102 a special notification which could cause a full replay. In embodiments, the controller 102 may request the replay of events by including a last-processed tag e.g. in a handshake message exchanged during reconnection and/or in an acknowledgment message.

In embodiments, controller 102 and/or switch 106 may persist the events, DPN-ID, and tags, across reboots. In embodiments, a special tag value may be included in the flow event message to indicate the wraparound of the unique tag identifier (e.g., where a tag is represented by a fixed, n-bit number, incrementing tag $2^n-1$ will cause a "wraparound," resulting in tag 0, and a flag may be used to indicate that such a wraparound has occurred).

At 204, controller 102 may process the flow event message.

Controller 102 may also ensure that the latest tag for a given DPN-ID is maintained across reboot of the controller 102. Accordingly, at 206, controller 102 stores in database 104 the tag contained in the flow event message (e.g., the tag may be stored in a record that contains the DPN ID as the primary key for the record).

At 208, controller 102 may send an acknowledgment (or "ack") message to the switch 106. In some embodiments, the "ack" message may be used to further optimize the resynchronization algorithm. Additionally, where switch memory is small, the "ack" message may also be advantageous. Controller 102 may include in the "ack" message 208 an indication of the tag that was processed (at 204-206). In embodiments, the "ack" bit can be piggybacked over a message being sent to the switch 106, or as a separate "ack" message for the tag. Upon receipt, the switch 106 may store the "ack" bit.

At 210, controller 102 may, at times, be inundated with a flood of messages arriving from one or more of switches 106, 108, 110. This step is optional.

At 212, controller 102 may choose to update the database 104 periodically, in a batch-processing mode, rather than updating the database once per message. Such periodic or batch-processing may reduce the synchronization time between tags. That is, controller 102 may wait until some amount of time has passed and/or until controller 102 has received a threshold number of additional flow event messages from the switch, where the additional flow event messages include additional tags; and then controller 102 may store all of the flow event data (e.g., including the associated tags) at once, in a batch mode, rather than issuing a store command each time that a flow event message is received. This step is optional.

At 214, switch 106 disconnects from controller 102, e.g. due to a problem with the switch, the controller, and/or the network connection.

At 216, switch 106 reconnects with controller 102. Such reconnection may include a second connection message, sent from the switch 106 to the controller 102. During this reconnection, the switch and controller will perform a handshake. As part of the handshake, controller 102 may send the last-processed tag corresponding to the switch 106 to the switch 106. Switch 106 receives the last-processed tag from controller 102, and may then send to controller 102 (e.g., at 219) all the events stored in switch 106 that occurred after that the last-processed tag. If no tag is sent from controller 102, switch 106 would replay all events (i.e. would send to controller 102 all events stored on switch 106). Switch 106 may, in some embodiments, during this handshake procedure, use a special tag, or other indicator, to indicate to controller 102 that there are no events stored on switch 106.

At 218, following reconnection, controller 102 may send an ACK message to switch 106 with an indication of the last tag that controller 102 has received from switch 106. This ACK message acknowledges all the events in the switch 106 up to and including the event represented by the last tag indicated by controller 102. Upon receipt of this ACK message, switch 106 may mark all corresponding messages as sent to and received by the controller (e.g., switch 106 may mark this in record 330, see FIG. 3).

At 220, controller 102 may process the events from switch 106 acknowledged at 218 and received at 216. At 222, controller 102 may then replay all the delta flow events as required.

Figure 3:
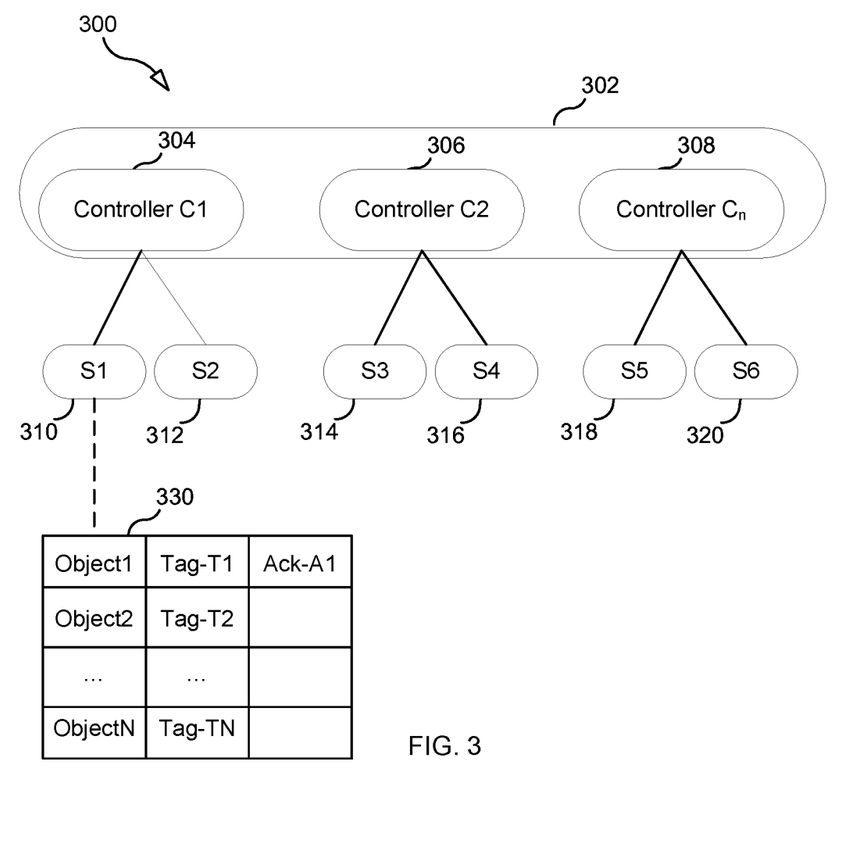
FIG. 3 illustrates a system according to some embodiments.

FIG. 3 illustrates a SDN network according to some embodiments. As shown in FIG. 3, network 300 may include a cluster 302 of one or more controllers 304, 306, 308. Each of controllers 304, 306, 308 may manage one or more switches. For example, as shown, controller 304 manages switches 310, 312; controller 306 manages switches 314, 316; and controller 308 manages switches 318, 320. As mentioned above, each switch 310-320 may maintain a TE database (see e.g., database 330), which, as illustrated in FIG. 3, includes a plurality of records where each record includes a field for storing a tag and field for storing a corresponding flow event data object (each record may also include a further field for storing an indicator to indicate whether a controller has acknowledged receipt of the event data object). The stored representation of the flow data event may be realized in a number of different formats. In a given SDN network 300, there may be one or more clusters (only one is shown in FIG. 3). In a cluster environment, according to some embodiments, after the connection recovery, the connecting switch 310-320 sends the last-acknowledgment tag to the controller 304-308. The controller 304-308 may then request replay of only those events that have not been acknowledged.

If one of controllers 304-308 goes down (e.g., fails in some way, or is scaled-in due to less load), then the switches managed by that controller may be apportioned to one or more of the remaining controllers 304-308. In a scale-out scenario, where a new controller is added to the cluster, the switches 310-320 may be load-balanced and re-apportioned among the available controllers 304-308. In either of these scenarios, a switch being (re)apportioned to a controller will not cause a complete resynchronization.

Controllers 304-308 in cluster 302 may be synchronized. For example, each of controller 304-308 may include a database 104 (shown in FIG. 1). In embodiments, controllers 304-308 (e.g., one or more of the controllers in cluster 302) may synchronize their corresponding databases.

As an example, suppose that switch 310 (shown as S1) connects back to controller 306 (shown as C2) after getting disconnected from controller 304 (shown as C1). S1 will report Tag-T1 as the last-acknowledged flow event (as shown in S1's record 330). Further supposing that C2's database (or local storage) shows a later flow event Tag-T2, then C2 may request S1 to send events after T2. As a further example, supposing that C2's database (or local storage) shows an earlier flow event Tag-T0, then C2 can request that the switch send events after flow event T1, knowing that it is possible that C2's DPN-ID TAG database may not have been updated (e.g., if C1 was caching events from S1 in order to batch process them, and did not flush its cache before a disconnection).

In embodiments, there is a reduced demand on persistence requirements for the flow event tags that need to be stored on the data store (e.g., database or local storage of controllers). Due to this, the amount of data exchanged between controller nodes in a cluster is also reduced.

As described above, in some embodiments it is possible that switch 106 resources will be limited, such as switch 106 storage capacity (e.g., local storage, or associated switch 106 database storage). As a result, it is possible that the tag storage will overflow. Embodiments are provided to prevent tag memory overflow in switches 106.

As discussed, it is possible that a switch 106 has assigned some amount of memory for storing the TE database. In such a case, it is possible that the switch 106 could completely fill this memory with events due to a burst of events generated or controllers 102 being down for a long time. In embodiments, the switch 106 may clear the TE database, such as by clearing acknowledged events. This may free up additional space. Alternatively, in immediate response to the arrival of an ACK message containing a set of one or more tags, the switch 106 could remove from the TE database each record containing a tag included in the set. However, if there are no records that can be removed from the TE database, the switch 106 may mark the database as being in a TAG_MEMORY_OVERFLOW condition (e.g., by setting a bit) and may refuse to store new events or alternatively may remove events that are not acknowledged. When the switch 106 performs reconciliation, in some embodiments, if the TAG_MEMORY_OVERFLOW condition is set, the controller 102 will have to replay all the flow events and reset the MEMORY_OVERFLOW_BIT so that the switch 106 can start storing tags and acknowledgment bits (if any) once again. In some embodiments, the controller 102 can send an acknowledgment periodically and also after a restart or reconnection of the switch 106.

As described above, in some embodiments it is possible to enable prioritization of notification from the switch 106 to the controller 102. After reconnection between a switch 106 and a controller 102, when the switch 106 pushes the tagged flow event notifications to the controller 102, in some embodiments this pushing occurs in the order of the flow event generation. This works well, for example, when all subscribers are treated on equal priority. When subscribers can have different priority, however, a controller 102 should be able to request prioritization of notification from the switch 106. Embodiments are provided that support priority notification.

In some embodiments, the controller 102 may pre-define the priority notification. If no definition exists, then notification from the switch 106 would be based on the switch's 106 default algorithm.

In some embodiments, the controller 102 may push the metadata information with each flow indicating the priority. This priority may then be used by the switch 106 while processing and pushing different priority notifications to the controller 102. The switch 106 may maintain the flow and metadata (priority) mapping. For flows with no metadata (priority) information, the flows may be treated as having a default priority.

In embodiments, whenever a flow event gets generated the switch 106 may check if the flow has any prioritization metadata. If so, such metadata can be encoded as part of the tag or as a separate entity; the switch 106 may also store the metadata (priority) along with the tag event.

During resynchronization, the controller 102 can request notification based on priority from switch 106. This gives flexibility for the controller 102 to control the switch 106 to prioritize the recovery of the flow database in the flow event of a disconnect with the switch 106.

Figure 4:
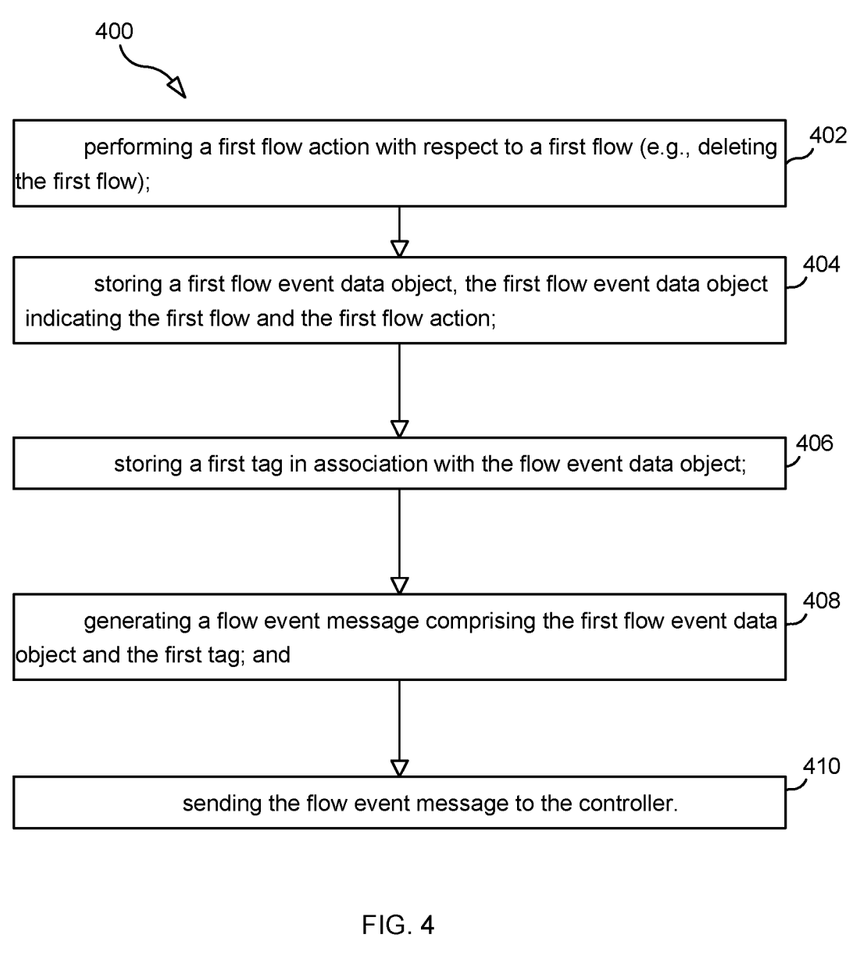
FIG. 4 illustrates a flow chart according to some embodiments.

FIG. 4 illustrates an exemplary process. Process 400 describes a method performed by a switch 106 in a software-defined network (SDN), the switch 106 being communicatively coupled to a controller 102. The method includes performing a first flow action with respect to a first flow (e.g., deleting the first flow) (step 402). The method further includes storing a first flow event data object, the first flow event data object indicating the first flow and the first flow action (step 404). The method further includes storing a first tag in association with the flow event data object (step 406) (as an example, see database 330, which shows tag "tag–100" stored in association with a particular event). The method further includes generating a flow event message comprising the first flow event data object and the first tag (step 408). The method further includes sending the flow event message to the controller 102 (step 410).

According to some embodiments, the method further includes receiving a first acknowledgment from the controller 102 indicating that the controller 102 has processed the flow event message associated with the first tag. The method may further include receiving, from the controller 102, and before storing the first tag in association with the flow event data object, a message comprising a flow identifier identifying the first flow and a priority indicator indicting the priority of the first flow. In some embodiments, the first tag comprises information that indicates the priority of the first flow. In some embodiments, the flow event message comprises a Data Packet Network (DPN) identifier (ID) identifying the switch 106.

In embodiments, the method further includes receiving from the controller 102 a message (e.g., a handshake message and/or acknowledgment message) comprising a tag; and in response to the message, retrieving, based on the tag included in the message, a set of one or more flow event data objects and sending, to the controller 102, the retrieved set of flow event data objects. In embodiments, retrieving the set of flow event data objects based on the tag included in the message comprises identifying from a plurality of stored flow event data objects each flow event data object included in the plurality being logically after the tag included in the message and retrieving the identified flow event data objects (e.g., where flow events that are logically after the tag included in the message may be determined by a timestamp, by an order in a linked list, and so on). In embodiments, the method further includes receiving a second acknowledgment from the controller 102 indicating the receipt of the set of flow event data objects and a last-acknowledged tag; and receiving a delta flow message from the controller 102 comprising flow events stored by the controller 102. In embodiments, the set of flow event data objects is ordered based on priority indications of the flow event data objects, and wherein sending, to the controller 102, the retrieved set of flow event data objects comprises sending the retrieved set of flow event data objects in the order based on the priority indications. In embodiments, sending, to the controller 102, the retrieved set of flow event data objects may include converting the formats of such objects into a format appropriate for sending to the controller 102.

In embodiments, the method further includes setting an error flag (e.g., TAG_MEMORY_OVERFLOW) indicating that an event could not be stored on the switch 106; and sending a special message to the controller 102 indicating that the error flag is set. In embodiments, the method further includes receiving a request from the controller to use a priority mode. In embodiments, the method further includes sending a first connection message to the controller 102 and sending a second connection message to the controller 102 following a disconnection between the switch 106 and the controller 102.

Figure 5:
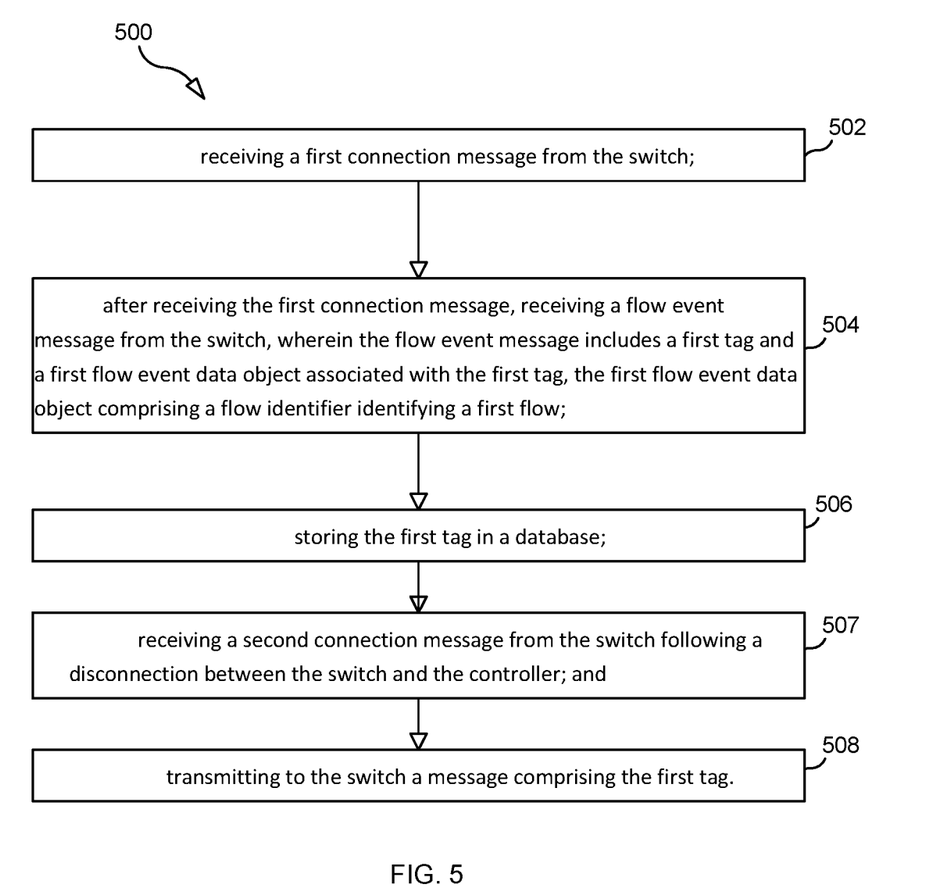
FIG. 5 illustrates a flow chart according to some embodiments.

FIG. 5 illustrates an exemplary process. Process 500 describes a method performed by a controller 102 in a software-defined network (SDN), the controller 102 being communicatively coupled to a switch 106. The method includes receiving a first connection message from the switch 106 (step 502). The method further includes, after receiving the first connection message, receiving a flow event message from the switch 106, wherein the flow event message includes a first tag and a first flow event data object associated with the first tag, the first flow event data object comprising a flow identifier identifying a first flow (step 504). The method further includes storing the first tag in a database (step 506). The method further includes receiving a second connection message from the switch following a disconnection between the switch and the controller (step 507). The method further includes transmitting to the switch 106 a message comprising the first tag (step 508).

According to some embodiments, the method further includes sending a first acknowledgment to the switch 106 indicating that the controller 102 has processed the first tag. The method may further include, prior to receiving the flow event message, sending to the switch 106 a priority indicator indicating a priority of the first flow. In embodiments, the flow event message indicates the priority of the first flow. In embodiments, the controller 102 extracts from the flow event message a Data Packet Network (DPN) identifier (ID) identifying the switch 106. In embodiments, the method further includes, after sending to the switch 106 the message comprising the first tag, receiving, from the switch 106, a set of one or more flow event data objects. In embodiments, the method further includes sending a second acknowledgment to the switch 106 indicating the receipt of the set of flow event data objects and a last-acknowledged tag; and sending a delta flow message to the switch 106 comprising flow events stored by the controller 102.

In embodiments, storing the first tag in the database includes waiting for additional flow event messages from the switch 106, wherein the additional flow event messages includes additional tags; and storing, in a batch mode, the first tag and the additional tags in the database. In embodiments, the controller 102 sends a request to the switch 106 to use a priority mode. In embodiments, the first acknowledgment is contained within another message from the controller 102 to the switch 106, such that the first acknowledgment is "piggy-backed" on the another message.

In embodiments, the method further includes receiving additional flow event messages from the switch 106, wherein the additional flow event messages include additional tags and additional flow event data objects associated with the additional tags, the additional flow event data objects comprising additional flow identifiers identifying additional flows; and after receiving additional flow event messages from the switch 106, sending a single acknowledgment message to the switch 106 indicating that the controller 102 has processed the first tag and the additional tags.

In embodiments, the step of transmitting to the switch a message comprising the first tag is performed in response to receiving the second connection message from the switch. In embodiments, the first tag comprised in the message represents a last-processed tag. In embodiments, the method further includes synchronizing the database with additional databases corresponding to additional controllers in a cluster. In embodiments, the message comprising the first tag comprises a handshake message, and in embodiment the message comprising the first tag comprises an acknowledgment message. In embodiments, the method further includes sending a first connection message to the controller and sending a second connection message to the controller following a disconnection between the switch and the controller.

Figure 6:
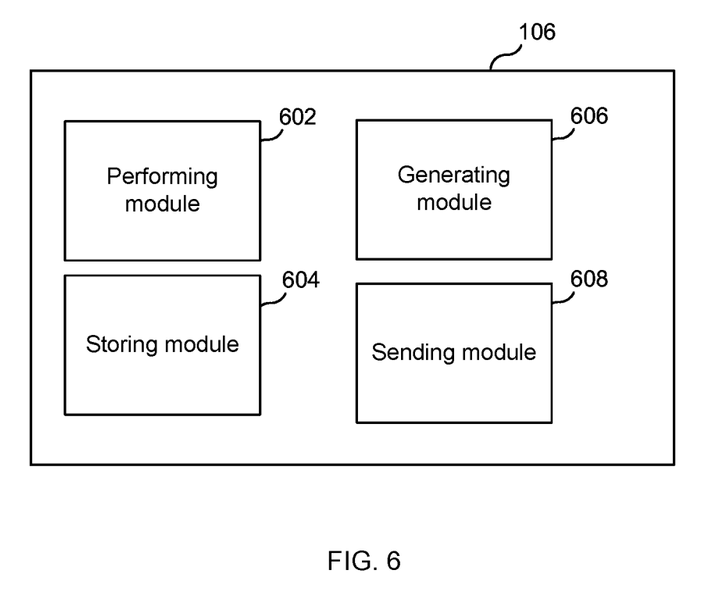
FIG. 6 is a diagram showing functional modules of a switch according to some embodiments.

FIG. 6 is a diagram showing functional modules of switch 106 according to some embodiments. As shown in FIG. 6, switch 106 includes a performing module 602, a generating module 604, a storing module 606, and a sending module 608. The performing module 602 is configured to perform a first flow action with respect to a first flow (e.g., deleting the first flow). The storing module 606 is configured to store a first flow event data object, the first flow event data object indicating the first flow and the first flow action; and to store a first tag in association with the flow event data object. The generating module 606 is configured to generate a flow event message comprising the first flow event data object and the first tag. The sending module 608 is configured to send the flow event message to the controller 102.

Figure 7:
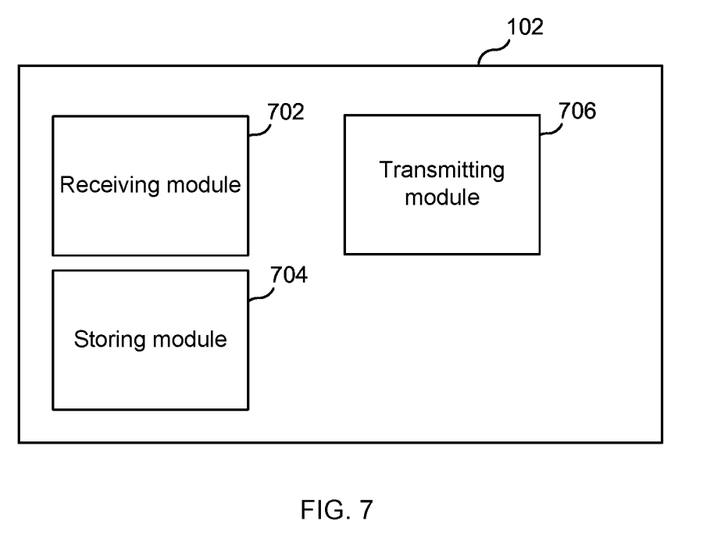
FIG. 7 is a diagram showing functional modules of a controller according to some embodiments.

FIG. 7 is a diagram showing functional modules of controller 102 according to some embodiments. As shown in FIG. 7, controller 102 includes a receiving module 702, a storing module 704, and a transmitting module 706. The receiving module 702 is configured to receive a first connection message from the switch 106; and, after receiving the first connection message, to receive a flow event message from the switch 106. The flow event message includes a first tag and a first flow event data object associated with the first tag, the first flow event data object including a flow identifier identifying a first flow. The storing module 704 is configured to store the first tag in a database. The receiving module 702 is further configured to receive a second connection message from the switch following a disconnection between the switch and the controller. The transmitting module 706 is configured to transmit to the switch 106 a message comprising the first tag.

Figure 8:
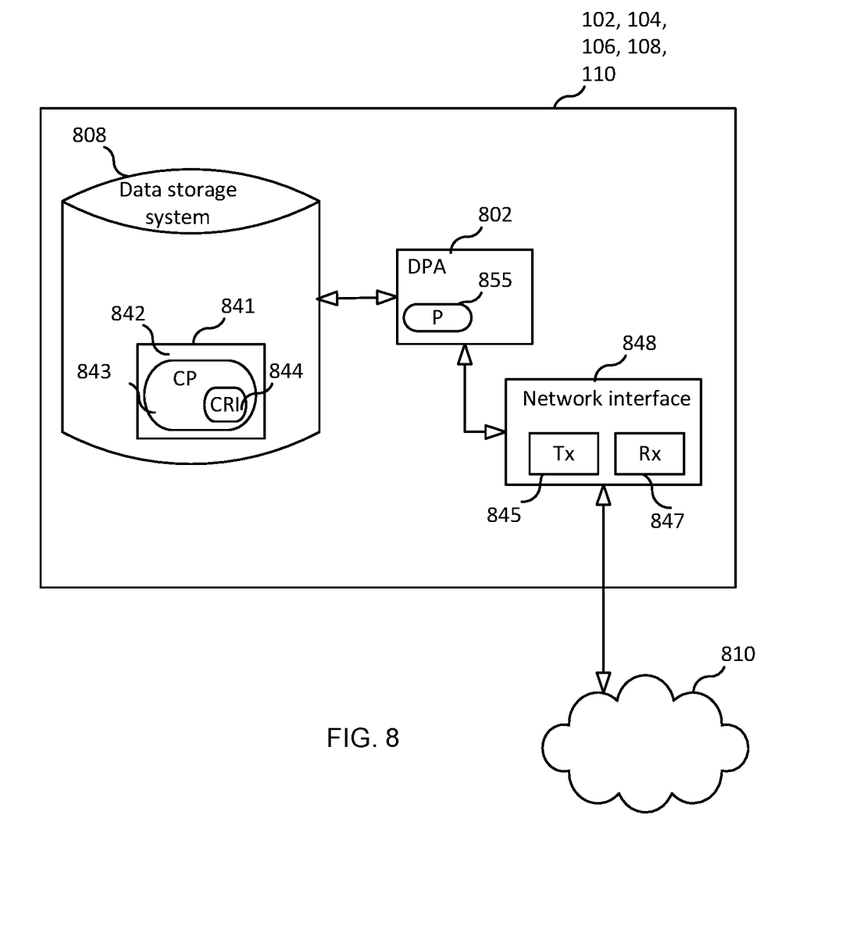
FIG. 8 is a block diagram of a controller and/or database and/or switch according to some embodiments.

FIG. 8 is a block diagram of controller 102, database 104, and/or switches 106, 108, 110 according to some embodiments. As shown in FIG. 8, controller 102, database 104, and/or switches 106, 108, 110 may comprise: a data processing apparatus (DPA) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 1045 and a receiver (Rx) 847 for enabling controller 102, database 104, and/or switches 106, 108, 110 to transmit data to and receive data from other nodes connected to a network 810 (e.g., an Internet Protocol (IP) network) to which network interface 848 is connected; circuitry 803 (e.g., radio transceiver circuitry) coupled to an antenna system 804 for wireless communication with UEs; and local storage unit (a.k.a., "data storage system") 808, which may include one or more non-volatile storage devices and/or one or more volatile storage devices (e.g., random access memory (RAM)). In embodiments where device 102 and/or 106 includes a general purpose microprocessor, a computer program product (CPP) 841 may be provided. CPP 1041 includes a computer readable medium (CRM) 842 storing a computer program (CP) 1043 comprising computer readable instructions (CRI)

844. CRM 842 may be a non-transitory computer readable medium, such as, but not limited, to magnetic media (e.g., a hard disk), optical media, memory devices (e.g., random access memory, flash memory), and the like. In some embodiments, the CRI 844 of computer program 843 is configured such that when executed by data processing apparatus 802, the CRI causes controller 102, database 104, and/or switches 106, 108, 110 to perform steps described above (e.g., steps described above with reference to the flow charts). In other embodiments, controller 102, database 104, and/or switches 106, 108, 110 may be configured to perform steps described herein without the need for code. That is, for example, data processing apparatus 802 may consist merely of one or more ASICs. Hence, the features of the embodiments described herein may be implemented in hardware and/or software.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a switch in a software-defined network, SDN, the switch being communicatively coupled to a controller, the method comprising:
performing a first flow action with respect to a first flow;
storing a first flow event data object, the first flow event data object indicating the first flow and the first flow action;
storing a first tag in association with the flow event data object;
generating a flow event message comprising the first flow event data object and the first tag; and
sending the flow event message to the controller.

2. The method of claim 1, further comprising receiving a first acknowledgement from the controller indicating that the controller has processed the flow event message associated with the first tag.

3. The method of claim 1, further comprising, receiving, from the controller, and before storing the first tag in association with the flow event data object, a message comprising a flow identifier identifying the first flow and a priority indicator indicating the priority of the first flow.

4. The method of claim 1, wherein the first tag comprises information that indicates the priority of the first flow.

5. The method of claim 1, wherein the flow event message comprises a Data Packet Network (DPN) identifier (ID) identifying the switch.

6. The method of claim 1, further comprising:
receiving from the controller a message comprising a tag; and
in response to the message, retrieving, based on the tag included in the message, a set of one or more flow event data objects and sending, to the controller, the retrieved set of flow event data objects.

7. The method of claim 6, wherein retrieving the set of flow event data objects based on the tag included in the message comprises identifying from a plurality of stored flow event data objects each flow event data object included in the plurality being logically after the tag included in the message and retrieving the identified flow event data objects.

8. The method of claim 7, further comprising:
receiving a second acknowledgement from the controller indicating the receipt of the set of flow event data objects and a last-acknowledged tag; and
receiving a delta flow event message from the controller comprising flow events stored by the controller.

9. A method performed by a controller in a software-defined network, SDN, the controller being communicatively coupled to a switch, the method comprising:
receiving a first connection message from the switch;
after receiving the first connection message, receiving a flow event message from the switch, wherein the flow event message includes a first tag and a first flow event data object associated with the first tag, the first flow event data object comprising a flow identifier identifying a first flow;
storing the first tag in a database;
receiving a second connection message from the switch following a disconnection between the switch and the controller; and
transmitting to the switch a message comprising the first tag.

10. The method of claim 9, further comprising sending a first acknowledgement to the switch indicating that the controller has processed the first tag.

11. The method according to claim 9, further comprising, prior to receiving the flow event message, sending to the switch a priority indicator indicating a priority of the first flow.

12. The method of claim 9, wherein the flow event message indicates the priority of the first flow.

13. The method of claim 9, wherein the controller extracts from the flow event message a Data Packet Network (DPN) identifier (ID) identifying the switch.

14. The method according to claim 9, further comprising:
after sending to the switch the message comprising the first tag, receiving, from the switch, a set of one or more flow event data objects.

15. The method of claim 14, further comprising:
sending a second acknowledgement to the switch indicating the receipt of the set of flow event data objects and a last-acknowledged tag; and
sending a delta flow event message to the switch comprising flow events stored by the controller.

16. The method of claim 9, wherein storing the first tag in the database comprises:
waiting for additional flow event messages from the switch, wherein the additional flow event messages includes additional tags; and
storing, in a batch mode, the first tag and the additional tags in the database.

17. The method of claim 14, wherein the controller sends a request to the switch to use a priority mode.

18. A device for a software-defined network, SDN, including a controller, the device comprising:
a performing module configured to perform a first flow action with respect to a first flow
a storing module configured to store a first flow event data object, the first flow event data object indicating the first flow and the first flow action;

the storing module further configured to store a first tag in association with the flow event data object;

a generating module configured to generate a flow event message comprising the first flow event data object and the first tag; and a sending module configured to send the flow event message to the controller.

19. A computer program product comprising a non-transitory computer readable medium storing a computer program comprising instructions which, when executed on at least one processor, causes the at least one processor to carry out the method according to claim 1.

20. The device of claim 18, wherein the first flow action with respect to the first flow comprises deleting the first flow.

* * * * *